Sept. 16, 1952          J. L. MURRAY          2,610,663
FRUIT REAMER
Original Filed Aug. 29, 1947
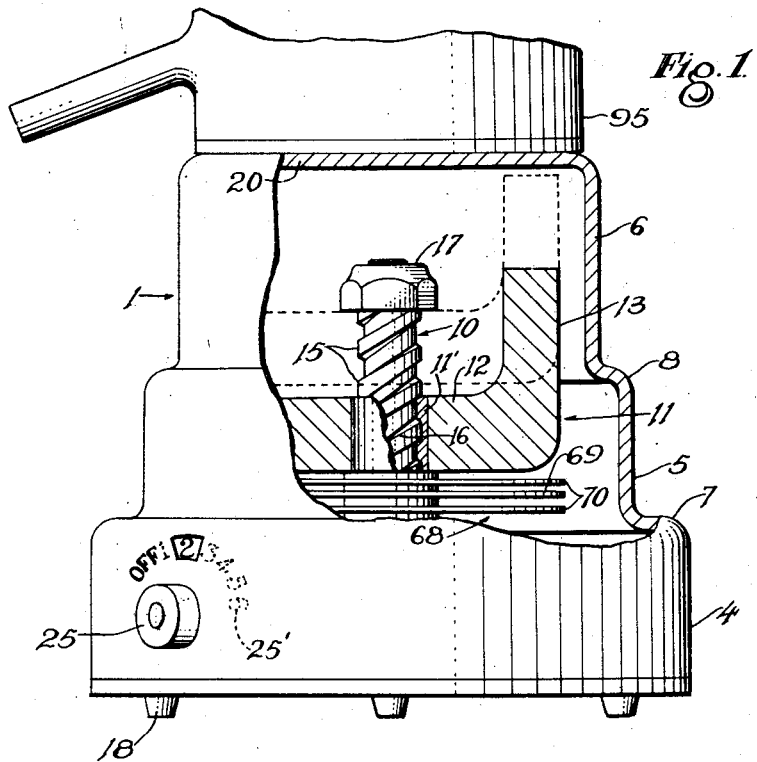
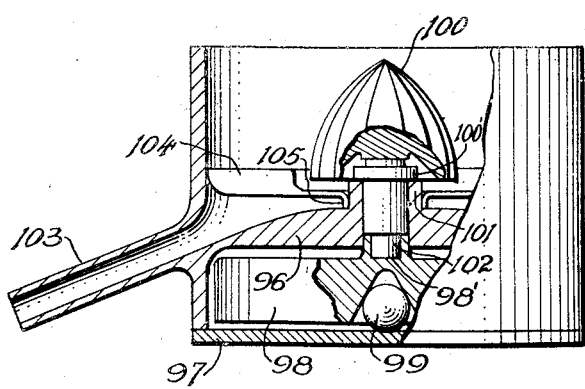
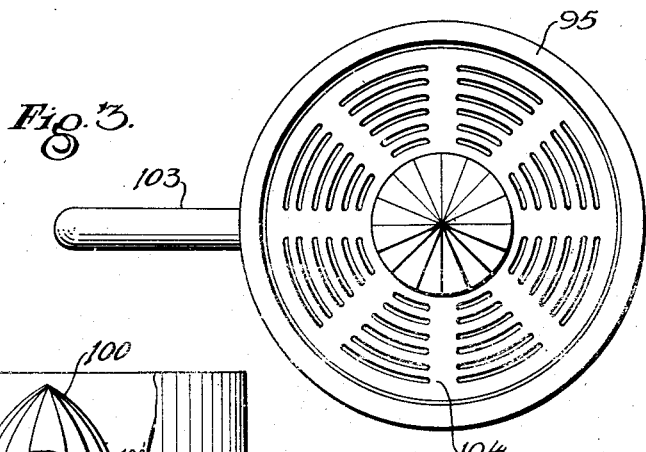
INVENTOR.
Jerome L. Murray
BY
Pollard my Johnston
ATTORNEYS

Patented Sept. 16, 1952

2,610,663

UNITED STATES PATENT OFFICE 2,610,663

FRUIT REAMER

Jerome L. Murray, Stamford, Conn.

Original application August 29, 1947, Serial No. 771,176. Divided and this application September 16, 1949, Serial No. 122,812

2 Claims. (Cl. 146—3)

This invention relates to devices for home and kitchen use although certain features thereof have other uses.

This application is a division of my copending patent application, Serial No. 771,176, filed August 29, 1947.

An object of the invention is a novel and improved juice extractor unit.

Further objects and the entire scope of the invention in this divisional application will be further apparent from the following detailed description and from the appended claims.

For a better understanding of the invention, reference may be had to the accompanying drawings forming a part of this application wherein:

Fig. 1 is a fragmentary elevational view partly in section diagrammatically illustrating a power unit with which this invention can be used.

Fig. 2 is an elevational view partly in section showing a juice extractor embodying the invention;

Fig. 3 is a plan view thereof.

The invention disclosed and claimed in this application relates to devices for extracting juice and the like. This juice extracting device is intended for use and in combination with a magnetic power unit of the type disclosed and claimed in my above mentioned copending application. A brief description of the power device will be set forth in this application to provide the necessary understanding of that device. However, a complete description of the power device may be had with reference to the above mentioned copending application.

The power device 1 (Fig. 1) comprises a suitable casing having, in the particular embodiment shown, three cylindrical portions or parts 4, 5 and 6 which are integrally formed as parts or portions of a single casing. The portions 4, 5 and 6 are formed of different diameters with the portion 4 having the larger diameter, the portion 5 a smaller diameter and the portion 6 of smaller diameter than the intermediate portion 5 and these portions are joined respectively to each other by the flange or shoulder portions 7 and 8. The power device 1 also comprises an electric motor housed in the bottom portion of the casing which motor is suitably geared to a vertical spindle or shaft 10 for driving the latter at a reduced speed. This shaft is disposed centrally of the casing.

The spindle or shaft 10 thus being driven by the motive power carries and drives a magnetic driving element 11 comprising a bar or main body part 12 and upwardly projecting polar parts 13 integrally formed at the ends of the main body part 12. The main body part 12 of the driving magnetic element is fastened to the spindle or shaft 10 in driving relation therewith and the upwardly projecting polar parts 13 are disposed at equal distances from the axis of the spindle or drive shaft 10. This driving magnetic element 11 may be of any suitable construction.

The driving spindle 10 may be provided at its upper portion and exteriorly thereof with a low pitch thread 15 and the body part 12 of the driving element can be provided with an opening therethrough having a similar low pitch thread 16 formed in the wall of the opening therethrough for cooperation with the low pitch thread 15. In the full line position shown, the driving magnetic element 11 is in the position corresponding to the stationary or de-energized position of the electric motor. In the dash line position, the driving magnetic element 11 is in operative position to drive the food preparing element 2, namely with the end surfaces of the poles 13 disposed as close thereto as is practicable. In this dash line position, the element 11 is held against further upward movement by a nut 17 fastened to the upper screw threaded end of the spindle 10, and the rotation of the shaft 10 is in a direction to tend to hold the element 11 in that position.

In Figs. 2 and 3, I have illustrated one part of a juicing unit embodying the invention which can be used with the previously described power unit. This comprises a cylindrical casing 95 having a partition 96 disposed approximately one-third of the way up from the bottom and having a bottom closure 97 of non-magnetic material such as stainless steel. Between the partition 96 and the bottom 97 is housed a magnetic driven element 98. It can have a conical bearing recess on the lower side thereof and centrally thereof and a ball bearing 99 rests on the bottom 97 and is housed within this recess. A juicer head or reamer 100 is suitably journaled centrally of the partition 96 in a journal 101 carried by the partition 96. The reamer is provided with a stem 100' extending down through the journal 101 and having a spline 102 which engages a corresponding slot or recess in an upwardly projecting central part 98' of the magnetic member 98 projecting up into the central opening formed in the partition 96. The reamer 100 is mechanically coupled with the driven element 98 by the mere act of inserting the stem of the juicer head 100 into the bearing 101 with the spline 102 engaging the recess in the driven element. The casing 95 is provided with a drain pipe 103 for the juice to flow out from the top of the partition 96 and a suitable grate 104 is disposed over the partition 96 so as to catch the pulp of the fruit being juiced. It is only necessary to position this device shown in Figs. 2 and 3 upon a power device such as illustrated in Fig. 1, and then energize the motor for driving the juicer head 100.

I claim:

1. A juice extractor unit adapted to removably rest upon the top surface of a magnetic driving device of the type having a rotatable driving magnet positioned beneath the said top, the extractor unit comprising a non-magnetic casing having a relatively flat bottom slidable on and off the surface of a driving unit, a partition in the casing forming a closed chamber in the lower portion of the casing, said partition having one aperture therein forming a journal, a single rotatable element of a ferro-magnetic material and having a vertical shaft journalled in said aperture, said element being disposed in the chamber and adapted to be rotated about an axis centrally located with respect to the chamber and said aperture, the rotatable element being so positioned to be driven by the driving magnet of the driving device when the unit is placed on the top surface of the device, and being constructed to be only magnetically driven, the portion of the casing above the partition having upwardly extending walls forming a juice extracting chamber, said juice extracting chamber having a discharge spout, a reamer, and means slidably coupling the reamer to said shaft, all the non-rotatable parts being of non-magnetic material.

2. A juice extractor unit adapted to removably rest upon the top surface of a magnetic driving device of the type having a rotatable driving magnet positioned beneath the said top, the extractor unit comprising a non-magnetic casing having a relatively flat bottom slidable on and off the surface of a driving unit, a partition in the casing forming a closed chamber in the lower portion of the casing, said partition having one aperture therein forming a journal, a single rotatable element of a ferro-magnetic material and having a vertical shaft journalled in said aperture, said element being disposed in the chamber and adapted to be rotated about an axis centrally located with respect to the chamber and said aperture, the rotatable element being so positioned to be driven by the driving magnet of the driving device when the unit is placed on the top surface of the device, said rotatable element of ferro-magnetic material being seated on a bearing on the upper surface of said relatively flat bottom, the portion of the casing above the partition having upwardly extending walls forming a juice extracting chamber, said juice extracting chamber having a discharge spout, a reamer, and means slidably coupling the reamer to said shaft, all the non-rotatable parts being of non-magnetic material.

JEROME L. MURRAY.

REFERENCES CITED

The following references are of record in the file of this patent:

UNITED STATES PATENTS

| Number | Name | Date |
|---|---|---|
| 1,389,454 | Murphy | Aug. 30, 1921 |
| 1,420,773 | Stainbrook | June 27, 1922 |
| 1,993,337 | Crowe | Mar. 5, 1935 |
| 2,350,534 | Rosinger | June 6, 1944 |
| 2,466,468 | Neal | Apr. 5, 1949 |